United States Patent [19]
Hansen

[11] Patent Number: 4,823,170
[45] Date of Patent: Apr. 18, 1989

[54] LINE OF SIGHT MEASURING SYSTEM

[75] Inventor: Per K. Hansen, South Burlington, Vt.

[73] Assignee: Position Orientation Systems, Ltd., Burlington, Vt.

[21] Appl. No.: 704,526

[22] Filed: Feb. 22, 1985

[51] Int. Cl.$^4$ .............................................. G01B 7/03
[52] U.S. Cl. .................................................. 356/375
[58] Field of Search ................... 356/375; 250/205 R; 358/107

[56] References Cited

U.S. PATENT DOCUMENTS 4,123,165 10/1978 Brown et al. .................... 250/203 R
4,315,282 2/1982 Schumacher ....................... 358/107

OTHER PUBLICATIONS

"An Automated Motion Measurement System for Clinical Gait Analysis", Taylor et al.
*Biomechanics*, vol. 15, #, pp. 505–516, 1982, Great Britain.

Primary Examiner—Richard A. Rosenberger
Attorney, Agent, or Firm—Sherman & Shalloway

[57] ABSTRACT

The present invention relates to a line-of-sight measuring system. The system comprises a passive optical pointing device which measures the relative change in line-of-sight of a focusing reflector attached to a target such as the operator of the device, located within a prescribed three dimensional space. The system utilizes a source of light adjacent a position sensing detector which source of light causes light to be reflected off the focusing reflector amd back to the position sensing detector. In this way, the line-of-sight between the object within the prescribed space and a particular location on a two dimensional screen positioned adjacent the prescribed space may be determined with great accuracy. The present invention also includes the electronic circuitry which interfaces the present invention with a computer such as a personal computer including an input keyboard and a display screen. Other applications of the present invention are also disclosed herein.

29 Claims, 8 Drawing Sheets

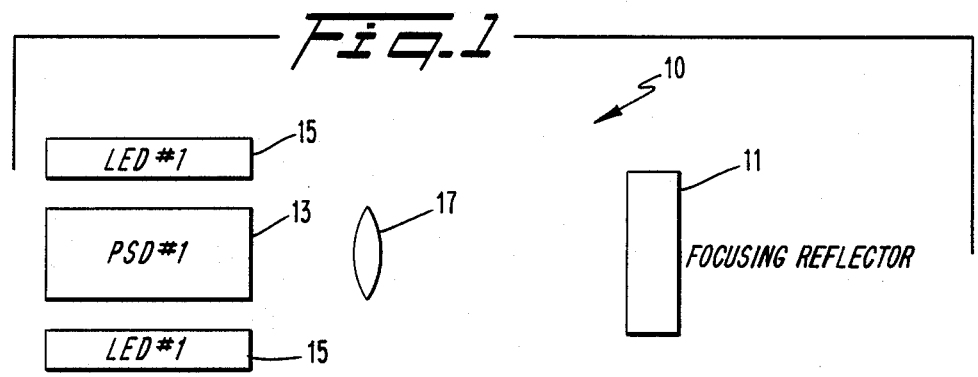
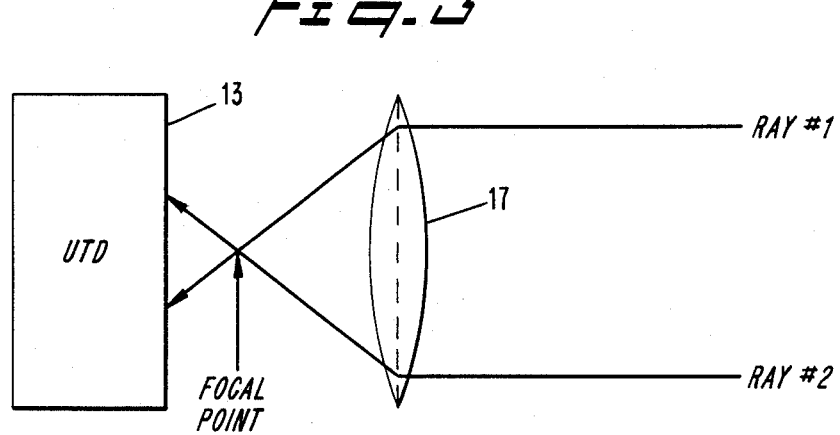
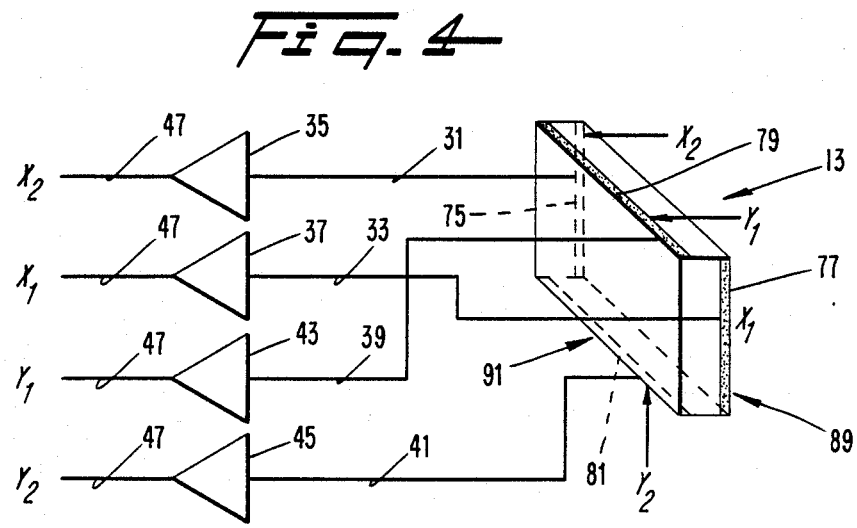

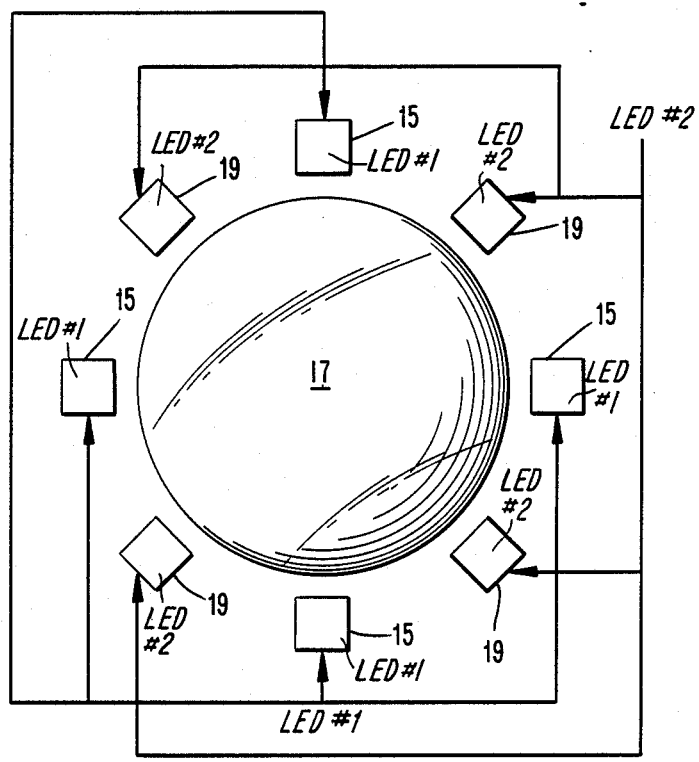
Fig. 9
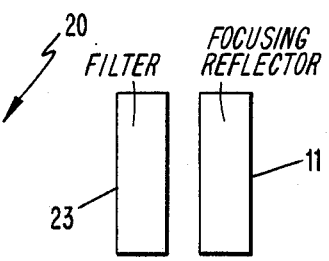
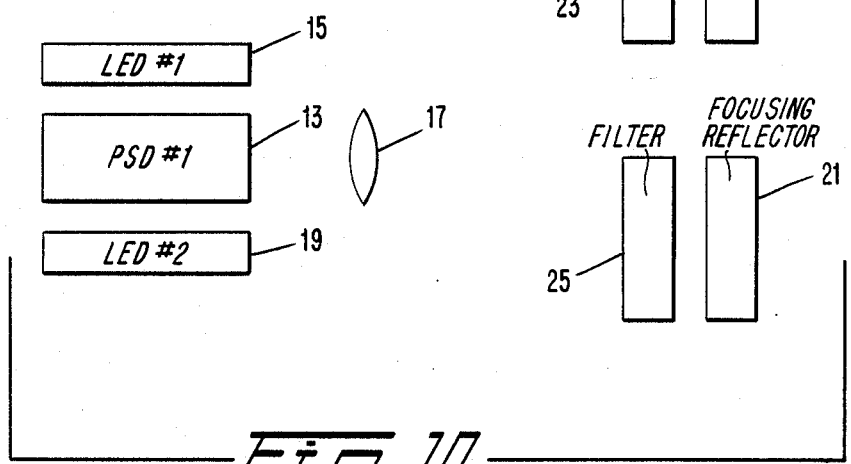
Fig. 10

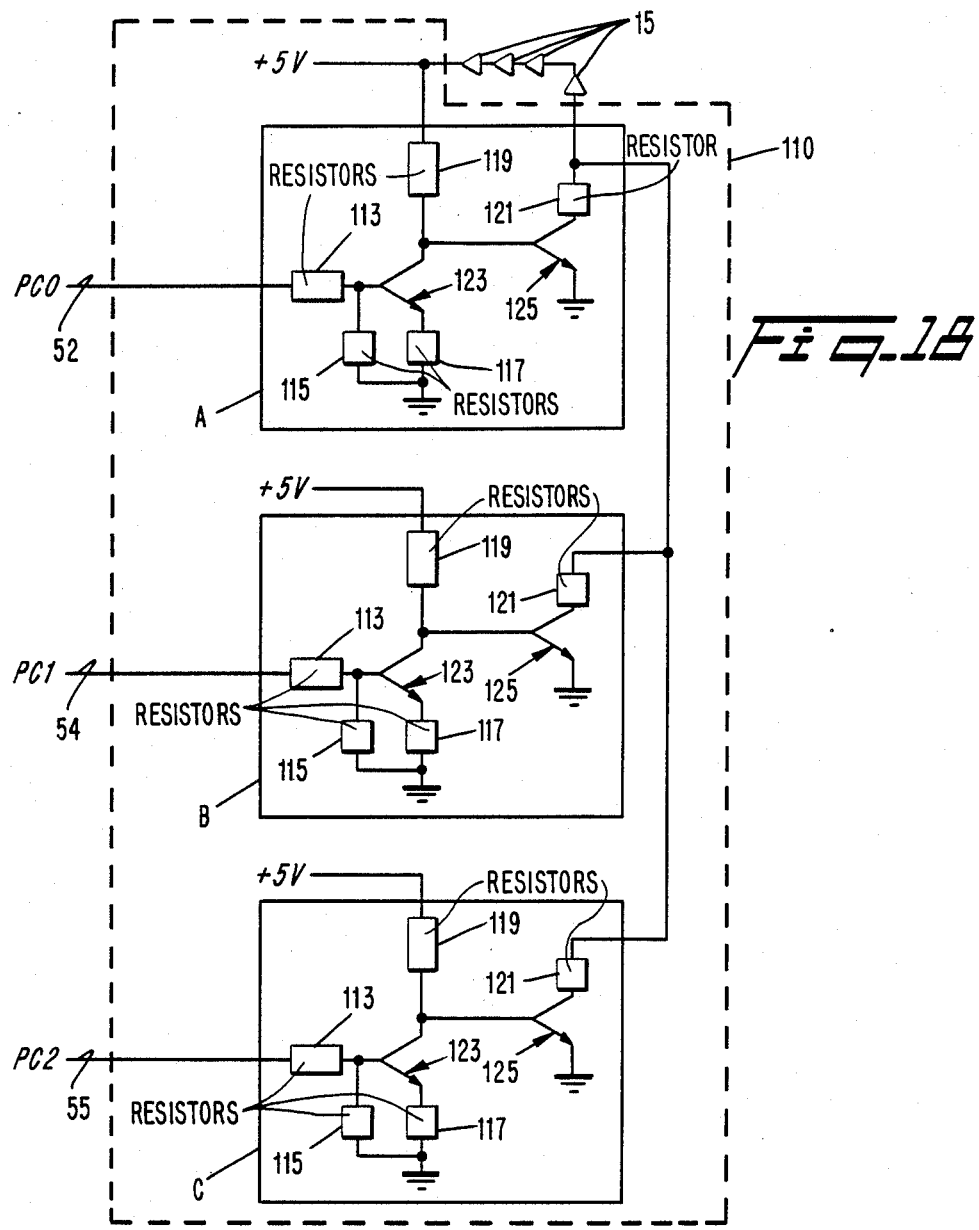
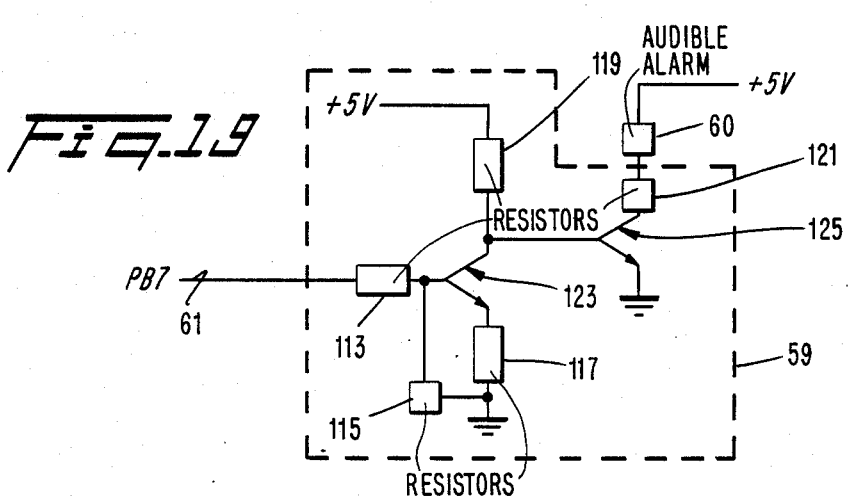

LINE OF SIGHT MEASURING SYSTEM

BACKGROUND OF THE INVENTION

In the prior art, various attempts have been made to provide a line-of-sight measuring system having the requisite simplicity so as to enable the use thereof in conjunction with a computer. The concept of a retroreflector which will reflect incident light back in the direction from where it came, is well known in the art. Applicant is aware of the following United States Patents, each of which teaches the concept of a concave reflector:

U.S. Pat. Nos. 1,966,792; 3,923,382; Re. 19070; 2,120,524; 2,273,847; 2,921,305. It is noted, however, that none of these patents teaches or suggests any of the concepts of the present invention other than the concept of a concave focusing retroreflector per se as taught in U.S. Pat. No. 3,923,382.

The following patents are also known to Applicant and are believed to be only generally related to the present invention:

U.S. Pat. No. 3,759,614 to Harvey discloses a device for determining the range from a camera to an object which is to be photographed. The device includes a light source which must be directed toward the target and further includes a sensor in the camera which determines the intensity of the received light to thereby enable the automatic focusing of the camera. The Harvey system is significantly different from the present invention in that the light source of Harvey is moved along with the camera in an aiming manner whereas in the present invention, the light source remains stationary during the entire operation thereof. Further, the Harvey device measures distance by measuring intensity of received light and does not measure the line-of-sight nor does the Harvey device translate the line-of-sight to cursor movement on a computer screen. A further difference resides in the fact that the Harvey device does not use a focusing reflector attached to the object which is to be photographed.

U.S. Pat. No. 3,885,872 to Howe, Jr., et al. discloses a digital proximity sensing system which utilizes a light source and a pair of photo-sensitive transducers. The device disclosed by Howe, Jr., et al. only measures the distance to an object and not the line-of-sight. The Howe, Jr., et al. device requires the use of two photosensors whereas in the present invention a single position sensing detector is utilized. The system does not use a focusing reflector attached to the target, includes no disclosure of translation of line-of-sight to cursor movement on a computer screen and does not contemplate movement of the target.

U.S. Pat. No. 4,207,002 to Gara, et al. discloses an apparatus for detecting an output image of an optical correlation which basically measures the dimensions of an object which is not moving. The Gara, et al. device illuminates the target from behind with a coherent light source which is different from the present invention which uses a passive focusing reflector to reflect light from a light source back to a position sensing detector adjacent to the light source.

U.S. Pat. No. 4,309,618 to Carter, Jr., et al. discloses an optical distance measurement device which merely finds the range to an object. The device relies upon the magnitude of the light received to determine the range, whereas in the present invention, no such measurement is made. In fact, in the present invention, the intensity of the light received is not taken into account whatsoever in the determination of the line-of-sight.

U.S. Pat. No. 4,313,654 to Matsui, et al. discloses an automatic range finder system for a photographic camera including light emitting and receiving means. The Matsui, et al. invention utilizes a number of zones of distance from the camera and determines which particular zone the target is located in to thereby cause the circuitry within the camera to automatically focus the camera so that any target within the particular zone is in focus. Of course, in this patent, no line-of-sight measurements are made, no translation of measurements to cursor movement on a computer screen are made, no focusing reflector is used and there is no contemplation of target movement.

U.S. Pat. No. 4,330,202 to Yokota discloses a range detecting device similar to Matsui, et al. discussed hereinabove except that no zone indication is used, the device merely measures the distance. The basic differences between the present invention and Yokota are the same as the basic differences between the present invention and Matsui, et al.

U.S. Pat. No. 4,341,447 to Biber, discloses an infrared camera ranging system which utilizes two infrared responsive sensors spaced a predetermined distance from one another on the camera body, which sense light emitted from a source of infrared light attached to the target. Of course, this is significantly different from the present invention in that the target has an active source of light whereas in the present invention a passive focusing reflector is used. The position sensors in Biber can only measure the relative angle to the target in the horizontal plane whereas in the present invention, the sensor measures the relative angle to the target in both the horizontal plane and the vertical plane. Other significant differences also exist.

U.S. Pat. No. 4,109,145 to Graf, discloses a line-of-sight detecting apparatus which produces signals indicative of the direction along which the operator's eye is gazing. A display with predetermined positions thereon is positioned for viewing by the operator and a computer receives the signals from the line-of-sight detecting apparatus and utilizing a timing function, determines when the operator's line-of-sight is directed toward one of the pre-determined positions on the display for a predetermined length of time. If the user looks at one of the targets long enough, the function correlated to that position on the target screen will be activated. There are several differences between the present invention and the invention disclosed by Graf. Firstly, in Graf, the direction at which the eye is looking is measured whereas in the present invention, in one mode thereof, the focusing reflector is attached to the person's head and the actual direction in which the head is facing is measured. Through the use of the present invention, a cursor on a computer screen is moved so as to line up with the direction in which the head is pointing. This is different from Graf, in that in Graf no cursor is moved. Rather, a fixed location on a screen is sensed so as to trigger the actuation of the function related to that position.

U.S. Pat. No. 4,340,878 to Spooner, et al. discloses a visual display apparatus which comprises a flight simulator used for pilot training. A spherical retroreflective screen is used to reflect back projected scenes to the pilot. In this invention, the spherical retroreflective screen operates only to reflect images back to the pilot for viewing and is not spherical for the purpose of focusing all incident light into one line-of-sight. It works as a true retroreflector with the reflected light being reflected parallel to the incident light and with the spherical shape of the screen giving the reflected light the maximum intensity. The screen is extremely large whereas in the present invention the retroreflector is extremely small. In Spooner, et al, the retroreflector does not move whereas in the present invention the focusing reflector moves with the target. In particular, in one application of the present invention, focusing reflector is attached to the head of the user and the line-of-sight, from the user's head with the focusing reflector attached thereto, to a point on a two-dimensional computer screen is determined and correlated with the computer screen cursor. This is completely opposite to Spooner, et al. wherein the retroreflector is separate from the head of the user.

U.S. Pat. No. 4,445,029 to Nagaoka, et al, discloses a distance detector using a photo-potentiometer and a continuous detecting system which measures the distance to an object which is to be photographed. The measurement is in zones similarly to the patent to Matsui discussed hereinabove and uses a single axis photocell. The difference between the present invention and Nagaoka are similar to the differences between the present invention and Matsui, et al.

U.S. Pat. No. 4,457,625 to Greenleaf, et al. discloses a self-calibrating contour measuring system which measures a surface over which a focusing reflector is being moved and is only used to measure curvature, does not measure line of sight and does not translate line of sight into cursor movement on a computer screen. Further, the device does not use a spherical shaped retroreflector as does the present invention.

Also known to applicant but only believed to be of general interest regarding the present invention is a publication entitled "Electronic Device Control Using the Retroreflective Concept" by Hodgetts, et al. and published in the Proceedings of International Conference on Rehabilitation Engineering - Toronto - 1980.

SUMMARY OF THE INVENTION

The present invention overcomes the deficiencies in the prior art as discussed hereinabove by providing a line of sight measuring system including the following concepts and features:

(1) The present invention provides a system which measures the relative change of an operator's line-of-sight and translates this change to movement of the cursor on a computer screen.

(2) The system of the present invention in one embodiment thereof, consists of one position sensing detector having a focusing lens surrounded by light emitting diodes. The light emitting diodes transmit pulsed infrared light at a particular wavelength which is reflected back from a focusing reflector toward the position sensing detector lens. The light is then focused by the lens onto the active area of the position sensing detector. In a further embodiment of the present invention, a plurality of targets may be tracked through the use of a corresponding plurality of focusing retroreflectors and LED's of the same plurality of wavelengths with each focusing reflector having a filter only allowing one of the wavelengths therethrough.

(3) As discussed hereinabove, the present invention utilizes a focusing reflector. The specific configuration of the focusing reflector must be either parabolic or partially spherical. This type of reflector acts to focus the reflected light into one line-of-sight and reflects the incident light back to the lens which is positioned adjacent to the source of light. With such a reflector, the system may measure the operator's movements up and down, left and right, as well as the operator's up and down, left and right rotations.

(4) The position sensing detector utilized with the present invention comprises a photodetector having two resistive layers, one layer being used for detection of movement in a horizontal direction and the other layer being used for detection of movement in the vertical direction. When light is focused on these layers, it will create a current therein and this current output is translated to a corresponding voltage in each preamplifier corresponding to each layer. Each of the resistive layers includes tow outputs, one for each side of the layer about the central portion thereof. The position sensing detector can also be any CCD (charge-coupled device) type device or any memory chip with its metal lid replaced with a glass lid. These position sensing detectors would be interfaced by scanning circuitry directly to the microprocessor instead of through the pre-amps and analog-to-digital convertor.

(5) The present invention is designed to be used peripherally with a computer such as a micro, mini or mainframe computer. An example of such a computer is the Macintosh computer made by Apple Computer, Incorporated. The present invention includes in and of itself, a microprocessor for calculation and control and this microprocessor interfaces with the host computer.

(6) In one embodiment of the present invention, the position sensing detector, lens and light source are attached as a unit on top of the computer screen of the host computer.

(7) The above described microprocessor which is included as an integral part of the present invention, includes several control and calculating algorithums within its memory. A first of these algorithms consists of a "feedback control routine" which measures the intensity of the reflected light, and increases or reduces the intensity of the transmitted light in order for the intensity of the reflected light to be within a predetermined level. This algorithm acts to increase and stabilize the system's signal-to-noise ratio even when the user moves further away from the position sensing detector or rotates his or her head to one of the extreme sides of the screen. A further algorithm included in the microprocessor consists of an algorithm to enable translation of the measured position change on the position sensing detectors 'x' and 'y' resistive layers into a line-of-sight change. A further algorithm enables the translation of the line-of-sight change into cursor movement changes on the computer screen. Further, the microprocessor is preprogrammed so as to enable the initial calibration of the present invention. In one aspect thereof, the cursor may be moved to the middle of the computer screen automatically when the system is turned on and thereafter the operator points the focusing reflector at the cursor as located in the middle of the screen for a predetermined time until such time as the system has been calibrated to that point and then is ready to be used. In a further aspect, the microprocessor is preprogrammed so as to enable self-re-calibration continuously and automatically. The operator of the device may leave the work area and then return and continue to work without any further calibration being necessary in light of this aspect.

(8) In a further aspect of the present invention, pulses may be transmitted through the computer via the "mouse port" so as to thereby order the cursor to move to a position corresponding to the line of sight to the focusing reflector. In this way, simulation of various mouse button functions such as "one click", "hold down" or "two clicks" may be accomplished in correspondence to the length of time in which the operator holds the line-of-sight on a selected target. The mouse interface is designed in such a manner that the computer does not know that it is not interfacing with the mouse. In this way, the present invention "steals" its power from the host computer via the mouse port.

(9) As inferred above, the present invention may be utilized with two operators with the use of light sources of differing wavelengths and corresponding filters placed in front of the focusing reflectors. In controlling such a system, the microprocessor is programmed so that the different light sources are pulsed sequentially and so that the computer is informed as to which focusing reflector is being tracked during any given pulse.

Accordingly, it is a first object of the present invention to provide a system which enables the measurement of the relative change of an operator's line-of-sight while the operator is operating a computer.

It is a further object of the present invention to provide such a system which utilizes a focusing reflector so as to enable the translation of movements of the operator's head in one mode thereof, into movement of the cursor on the computer display screen.

It is a further object of the present invention to provide such a system with a photodetector which enables the calculation of the precise line-of-sight from the operator's head or other portion of the body to a particular position on the screen through the use of a position sensing detector which enables the measurement into dimensions.

It is a further object of the present invention to provide such a system with its own microprocessor which is preprogrammed with the algorithms needed so as to enable the fulfillment of the objects set forth hereinabove.

It is a further object of the present invention to provide such a system which is usable with minor modifications in conjunction with more than one operator in a simultaneous sequential fashion.

These and other objects, aspects and features of the present invention will become more evident from the following detailed description of the preferred embodiments when read in conjunction with the appended drawing figures.

BRIEF DESCRIPTION OF THE DRAWINGS

FIG. 1 shows a schematic view of the present invention in a first embodiment thereof employing only a single focusing reflector.

FIG. 3 shows a schematic view of the position sensing detector of the present invention and its associated lens.

FIG. 4 shows a schematic diagram of the position sensing detector of the present invention and the connections therefrom to the associated preamplifiers.

FIG. 9 shows a front view of the position sensing detector lens and the sources of light mounted in surrounding relation thereto.

FIG. 10 shows a schematic view of a second embodiment of the present invention including two focusing reflectors and their associated bandpass filters.

FIG. 18 shows the electrical circuitry involved in the flow chart of FIG. 17.

FIG. 19 shows the electrical circuitry for various audible sounds which are built in to the present invention so that the operator thereof known when certain functions have been performed.

SPECIFIC DESCRIPTION OF THE PREFERRED EMBODIMENT

Figure 2:
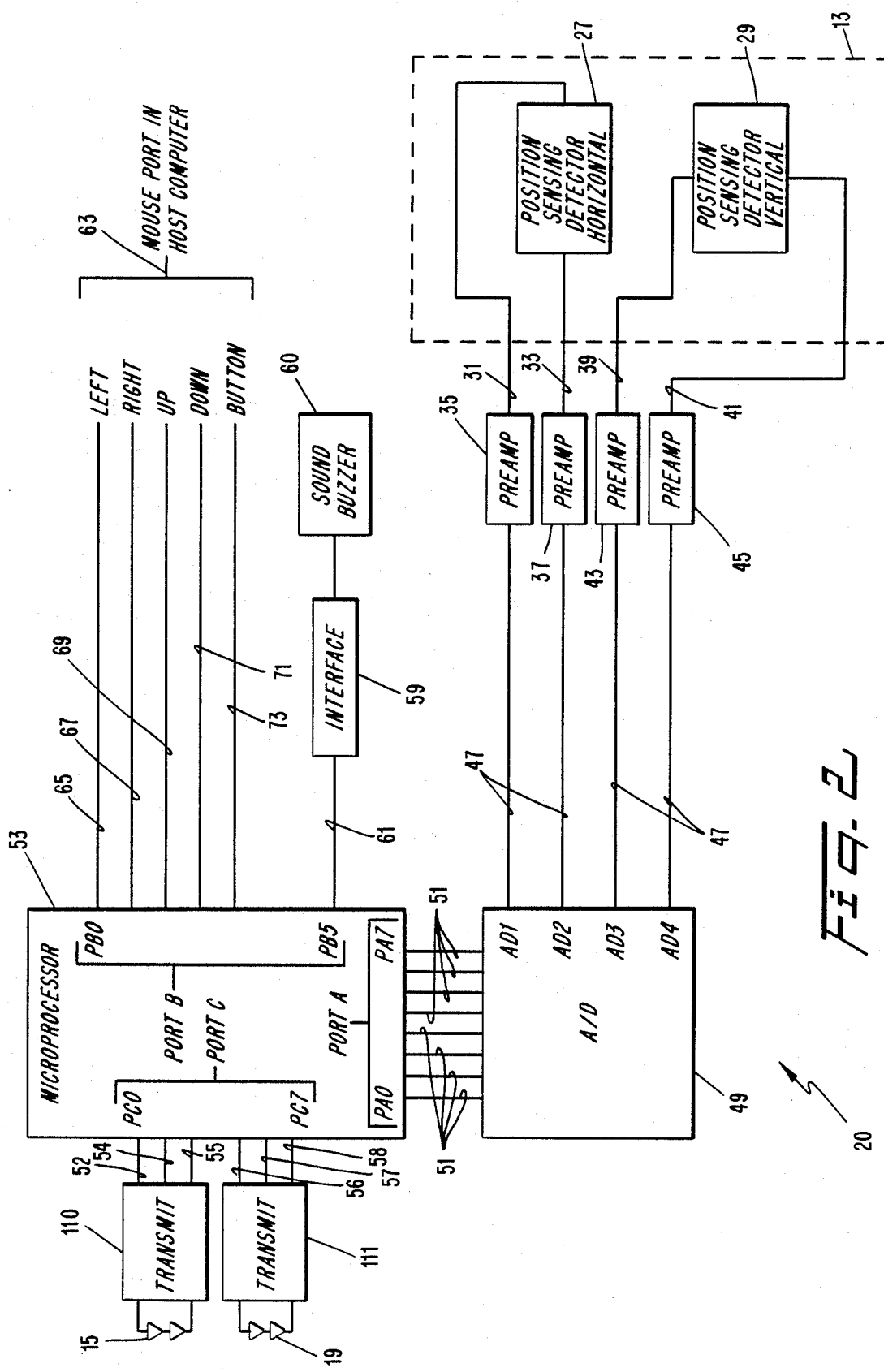
FIG. 2 shows a block diagram of the circuitry for the system of FIG. 1 and/or 10.

Reference is now made to FIGS. 1, 2, 10 and 11. FIG. 1 shows a first embodiment of the present invention generally designated by the reference numeral 10. The system 10 in accordance with the present invention, includes a focusing reflector 11, a plurality of sources of light 15, each such source, for example, emitting infrared light of the same wavelength and a position sensing detector 13 which receives light which emanates from the light sources 15, reflects off of the retroreflector 11 and is focused by the lens 17.

Figure 11:
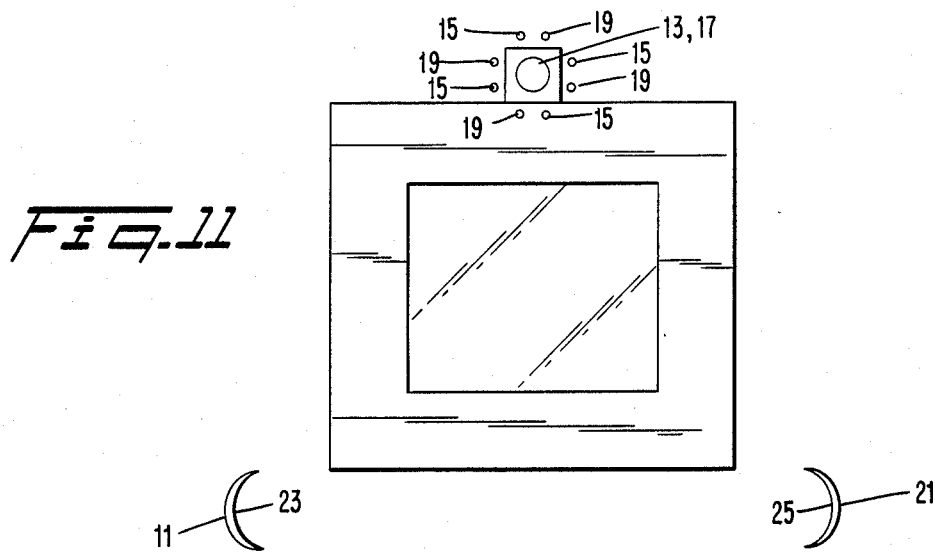
FIG. 11 shows a front view of the invention shown schematically in FIG. 10, showing the relationship between the present invention and the associated host computer.
Figure 12:
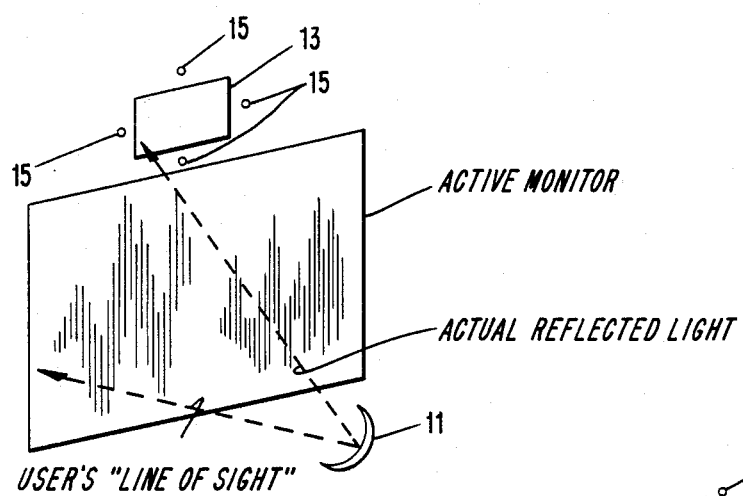
FIGS. 12–15 show examples of particular lines-of-sight and the resultant position of the reflected light beam on the position sensing detector.
Figure 13:
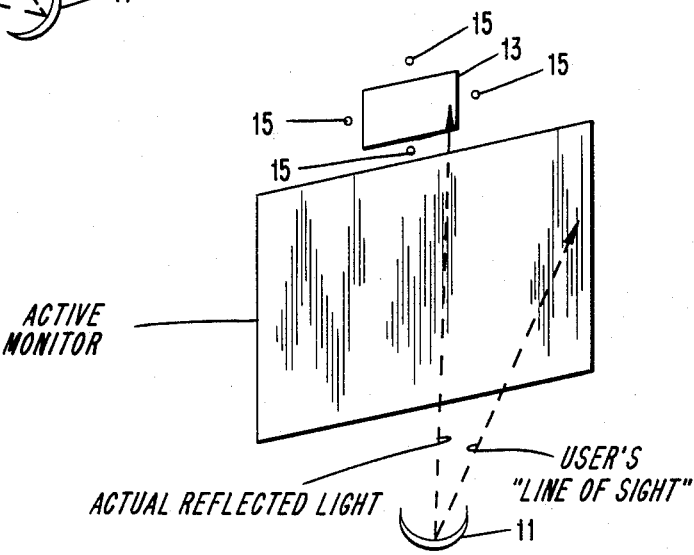
Figure 14:
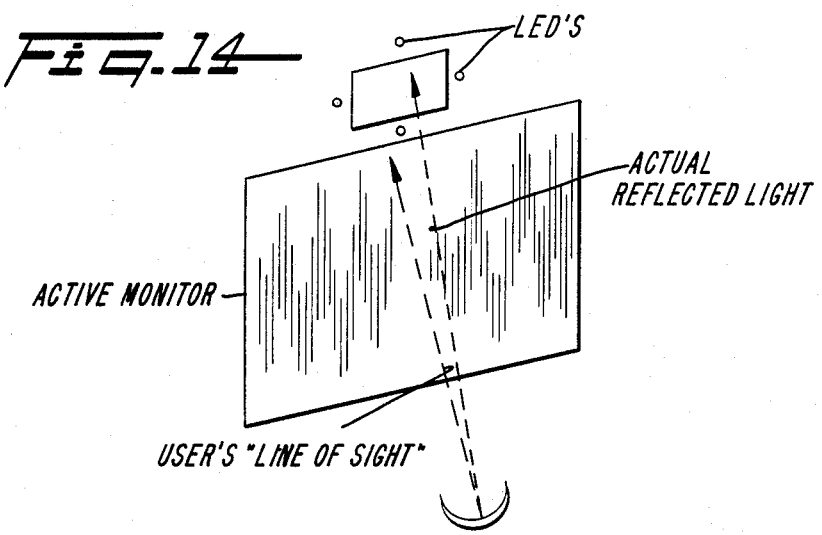
Figure 15:
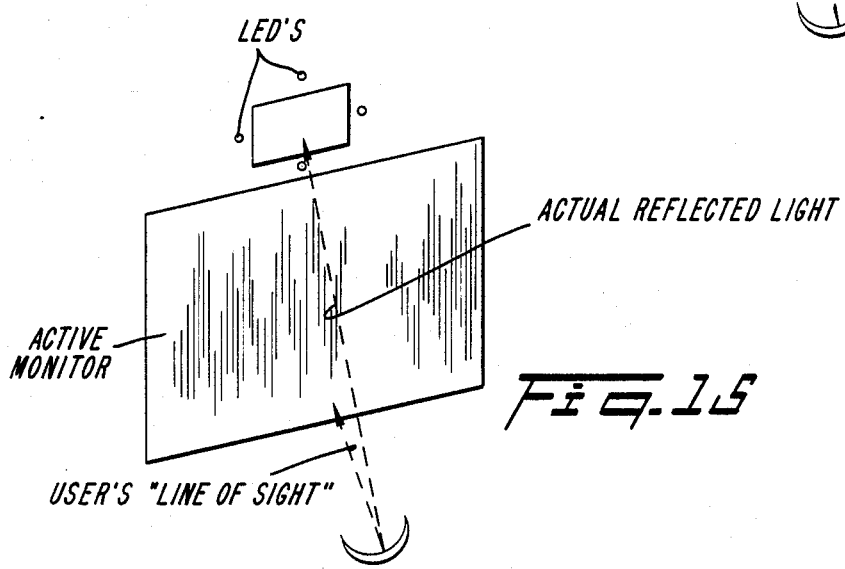

With reference now to FIG. 10, it is seen that a second embodiment of the present invention designated by reference numeral 20 has certain elements thereof in common with the embodiment of FIG. 1. Accordingly, the common elements have been designated with the same reference numerals. With reference to FIG. 10, it is seen that a position sensing detector 13 with associated lens 17 are provided. Further, a first source of light 15 and a first reflector 11 are also provided. The embodiment of FIG. 10 differs from the embodiment of FIG. 1 in that the system 20 further includes a source of light 19 having a wavelength differing from the wavelength of the source of light 15 and further in that a second reflector 21 is provided. The retroreflector 11 is provided with a bandpass filter 23 in front thereof which is designed to only allow light therethrough to the wave length of the source of light 15. In a similar fashion, the focusing reflector 21 has a bandpass filter 25 in front thereof which is designed to only allow light of the wavelength of the source of light 19 to pass therethrough. Accordingly, it should be understood, that the system 10 may be utilized to determine the position in two degrees of freedom, of one retroreflector 11, whereas, the system 20 shown in FIG. 10 may be utilized to determine the position in two degrees of freedom of two focusing reflectors 11 and 21. FIG. 11 shows a front view of the system 20 also shown in FIG. 10.

With reference to FIG. 2, the system will be described in greater detail. The system shown in FIG. 2, may be utilized in either of the embodiments shown in FIGS. 1 and 10. If the system shown in FIG. 2 is being used in the embodiment shown in FIG. 1, obviously, the extraneous elements such as the light source of wavelength No. 2 would not be used.

FIG. 2 shows the system which will be designated with the same reference numerals the embodiment shown in FIGS. 10 and 11, to-wit, 20. The system 20 includes position sensing detector 13, the first source of light 15, and the second source of light 19. If desired, the sources of light 15 and 19 may be infrared light emitting diodes with each such source transmitting a distinct wave length of light. As shown in FIG. 2, the position sensing detector 13 includes a horizontal position sensing detector 27 and a vertical position sensing detector 29 which will be described in greater detail hereinafter with reference to FIGS. 4-6. The horizontal position sensing detector 27 includes two electrical lines 31 and 33 which respectively are inputted into preamplifiers 35 and 37. In a similar way, the vertical position sensing detector 29 connects with preamplifiers 43 and 45 via the leads 39 and 41. The preamplifiers 35, 37, 43 and 45 translate currents received thereby from the position sensing detector, which currents are indicative of the location of a light spot thereon, and translate these currents into corresponding voltages. The voltages are transmitted via lines 47 to an analog-to-digital converter 49 which converts the analog voltage signals into digital signals which may be outputted via lines 51 to the microprocessor 53 which also forms a part of the present invention. The microprocessor 53 receives the digital signals from the analog-to-digital converter 49 and utilizes the signals in controlling the system 20. For example, the microprocessor controls the transmission of light from the light sources 15 and 19 by the respective lines 52,54, 55 and 56,57, 58. Furthermore, the microprocessor 53 controls the actuation of a control means 59 for a sound buzzer via the line 61. The sound buzzer comprises an audible feedback means utilized when the present invention is plugged into the "mouse port" in the host computer to tell the user when he or she has held the line-of-sight on a target long enough to activate the mouse button. In one example of the use of the sound buzzer, the audible feedback may give one short tone for "one click", a long tone for "hold down" and two short tones for "two clicks."The circuitry utilized in actuating the sound buzzer is best seen with reference to FIG. 19.

As shown in FIG. 2, the present invention may be plugged into the "mouse port" 63. In order for this to occur, five output lines 65, 67, 69, 71 and 73 are utilized for the respective communication of five bits to the mouse port. In the same order, the five respective bits control left hand movement, right hand movement, upward movement, downward movement, and the mouse button. The present invention as embodied in the system 20 keeps tabs on the old position of the cursor $X_0 Y_0$ and translates the change of the line-of-sight as sensed by the system into relative cursor position $X_n Y_n$. The present invention is similarly usable with a digitizer, a touch screen, a touch tablet or cursor function keys.

Figure 5:
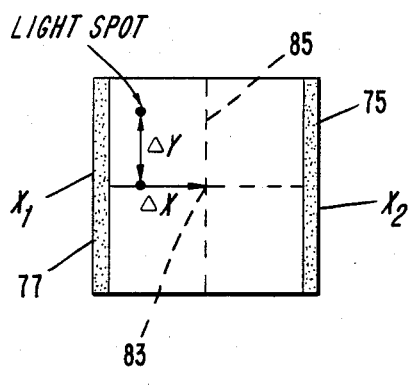
FIGS. 5 and 6 show respective views of the 'x' and 'y' resistive layers for the position sensing detector shown in FIG. 4.
Figure 6:
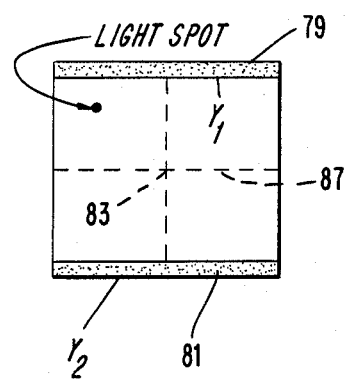

FIG. 3 shows a schematic view of the relationship between the position sensing detector 13 and its associated lens 17. The purpose for FIG. 3 is to show that the lens 17 is placed a sufficient distance from the position sensing detector 13 so that the focal point of the lens is between the lens 17 and the position sensing detector 13, thereby resulting in rays of light which strike the lens at opposite sides thereof crossing during their travel to the active areas of the position sensing detector 13. With reference now to FIGS. 4, 5 and 6, the specific details of the position sensing detector 13 will now be described. In each of the embodiments, the position sensing detector 13 which will be used is the same and the position sensing detector 13 is meant to be exemplary of all position sensing detectors used in conjunction with the present invention which, for example, could be CCD's or memory chips. If a CCD is used as the position sensing detector, the analog-to-digital converter and preamplifiers would not be necessary and scanning circuitry would be interposed between the microprocessor and the CCD position sensing detector. The position sensing detector 13 utilizes a highly sensitive planar type PIN silicon photo diode with uniform layers formed on the top and bottom thereof. When a light spot is focused upon the active area of the position sensing detector, electron-hole pairs are generated at the focused spot in the depletion layer thereof. Output currents are formed thereby on both resistive layers 89 and 91 and at each of the four electrodes, the x-axis electrodes 75 and 77, and the y-axis electrodes 79 and 81. Currents to the electrodes 75 and 77 are controlled through the top resistive layer 89 whereas currents to the electrodes 79 and 81 are collected through the bottom resistive layer 91. These currents are divided in proportion to the resistance between the focused spot and the particular electrode, such resistance being proportional to the distance from the electrode to the spot. The sum of the currents from x-axis electrodes 75 and 77 is proportional to light spot intensity as is the sum of the currents from y-axis electrodes 79 and 81.

The difference between the currents from the two x-axis electrodes $I_{77}-I_{75}$ is proportional to the intensity of the light spot as well as the distance of the light spot to the null line 85 (FIG. 5) which is midway between the x-axis electrodes 75 and 77. If the light spot was directly in the middle, on the line 85, the two currents $I_{75}$ and $I_{77}$ would be equal. $I_{75}$ is greater than $I_{77}$ when the light spot is closer to the electrode 75 and $I_{77}$ is greater than $I_{75}$ when the light spot is closer to the electrode 77. Similarly, the difference between the currents from the two y-axis electrodes 79, 81 is proportional to the light spot intensity and the distance of the light spot to the null line 87 shown in FIG. 6.

The output current from each of the electrodes is led to a respective transimpedance preamplifier as discussed hereinabove with reference to FIG. 2. In particular, the x-axis electrode 75 feeds the transimpedance preamplifier 35, the x-axis electrode 77 feeds the transimpedance preamplifier 37 and the y-axis electrode 79 feeds the transimpedance preamplifier 43 and the y-axis electrode 81 feeds the transimpedance preamplifier 45.

Dividing the differences of the voltages with the sum of the voltages for the x and y electrodes will result in a figure which is proportional only to the distance of the light spot from the respective null line 85 or 87. Thus, $$\frac{V_{77} - V_{75}}{V_{75} + V_{77}}$$

is proportional to ΔX; in the same way $$\frac{V_{79} - V_{81}}{V_{79} + V_{81}}$$

is proportional to ΔY.

In each equation, the result will be positive or negative depending which side of the null lines 85, 87, the light spot is located. While the location of the null lines may be adjusted electronically, in the preferred embodiment, such adjustments are not made. The system first reads the voltages without turning the LED's on and subtracts these voltages from the measured voltages with the LED's turned on. In this way, there is no need for bias voltages in the preamplifiers and preamplifier noise as continuously compensated for.

The intensity of the light spot is proportional to the distance between the position sensing detector 13 and the respective focusing reflector 11 or 21. Since inaccuracies are inherent when measuring such intensity by summing preamplifier voltages, in the preferred embodiments of the present invention, this summing technique is not employed.

Figure 7:
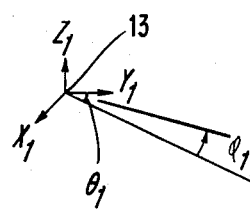
FIG. 7 shows the geometry of the embodiment shown in FIG. 1.

As stated hereinabove, the present invention is a passive optical pointing device, which in one mode thereof, measures the relative change in line-of-sight of the operator and translates this relative change into relative cursor movement on a display. In this light, reference is made to FIGS. 7 and 12–15 which describe in great detail the geometry of the system. As shown in FIG. 7, the position sensing detector 13 is positioned at a point spaced in some manner from the target which is represented by the focusing reflector 11. As shown in FIG. 7, the present invention determines the angle $\theta$ which defines the position of the point 14 determined by the projection line 12 with respect to the x and y axis, and further determines the angle $\phi$ between the target and the plane defined by the x and y axes. As demonstrated in FIGS. 12–15, the microprocessor 53 is preprogrammed so that when the focusing reflector is pointing at a certain region of the monitor screen, the reflection of light from the sources of light onto the active area of the position sensing detector 13 corresponds to the actual location on the monitor screen at which the user is pointing the focusing reflector.

Figure 8:
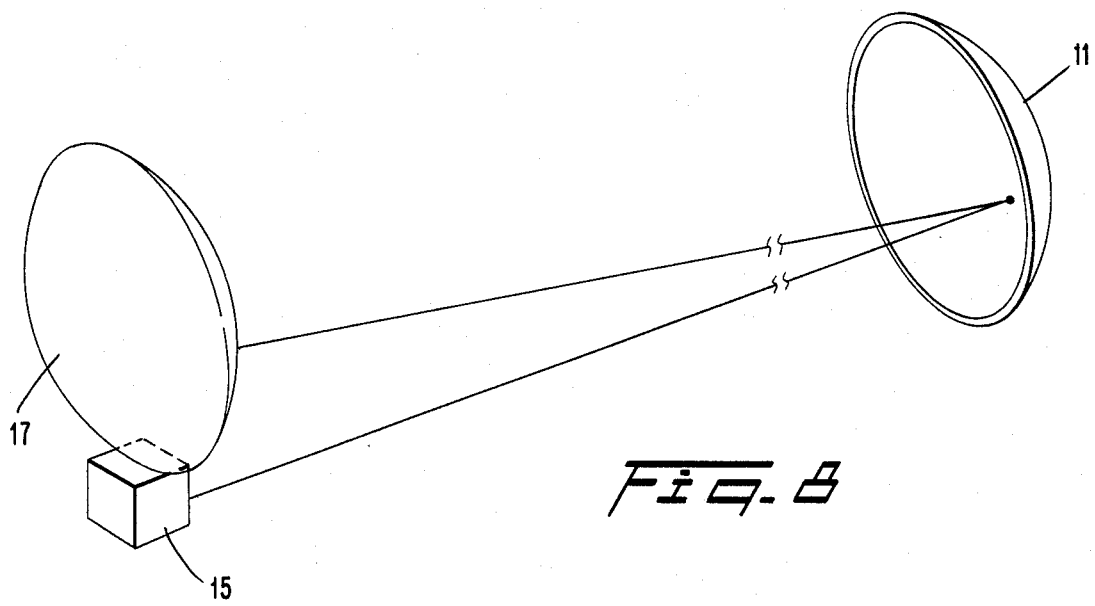
FIG. 8 shows a schematic view of a source of the light, the lens of the position sensing detector and the focusing reflector with an incident and reflecting beam of light being shown therein.

Reference is now made to FIGS. 8 and 9 which show the relationship between the source of light, the lens and the focusing retroreflector. As shown in FIG. 9, the sources of light, which may in some cases consist of infrared light emitting diodes, are arranged immediately adjacent the lens 17. As further shown in FIG. 8, the retroreflector has a parabolic or partially spherically shaped form which collects the incident light rays and focuses them into a single reflecting beam closely related to the line-of-sight between the head of the user and the location on the monitor screen at which the user is looking, as further explained hereinabove with reference to FIGS. 12–15.

Figure 16:
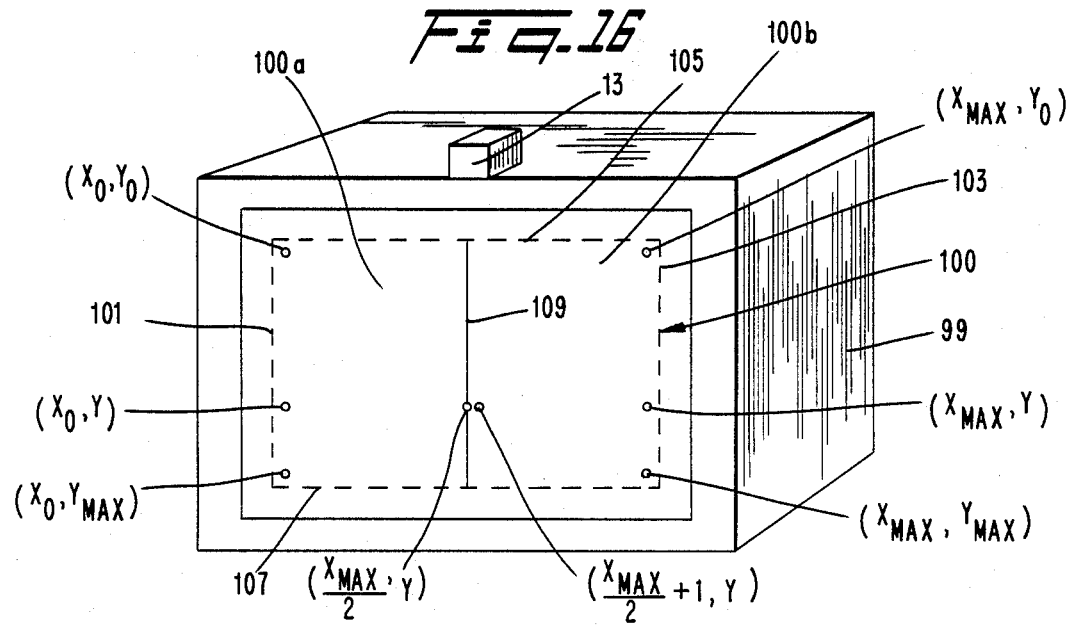
FIG. 16 shows a further embodiment of the present invention wherein the host computer display screen is divided into two subscreens.

Reference is now made to FIG. 16 which shows not only a further embodiment of the present invention but also is utilized to describe the initial calibration of the invention and a scheme for recalibration thereof in a continuous manner. As described hereinabove, the present invention may be utilized in conjunction with a MacIntosh computer. While the present invention is not limited to use in conjunction with a MacIntosh computer, such use will provide the basis herein for examples of the operation of the present invention. With reference to FIG. 16, if desired, the screen 100 may be divided into two screens, 100a and 100b. The present invention does not move the cursor initially but allows it to be at the position ($X_0$, $Y_0$) at which the computer places the cursor when the power is initially turned on. With the power turned on, translation coordinates ($S_{ST}$, $Y_{ST}$) which relate to the operator placing their line-of-sight in the middle of the first screen are set. These translation coordinates take into account the parallax caused by the placement of the position sensing detector 13 on the top of the monitor 99 containing the screen 100. The translation is accomplished through preprogramming of the microprocessor 53, and makes the middle of the work area related to the position of the cursor in the middle of the first screen.

The present invention also includes programming of the microprocessor 53 for continuous recalibration. In this mode, the edges of the screen 100 are utilized for continuous recalibration. First, the left hand edge 101 and the right hand edge 103 are utilized. When the operator moves the line-of-sight to the left, the recalibration scheme will grab onto the cursor and hold it to X coordinate 0 when it first arrives there. No matter how much more the user moves the line-of-sight to the left, even if such movement places the line-of-sight off the screen, the cursor will still be held at 0 in the X coordinate at whatever Y coordinate it was last at. Then, when the user moves to the right, the last measured value of the line-of-sight will be the reference value and the cursor will move to the right by the change in measured value of line-of-sight translated to cursor movement. In this way, if the user has moved the cursor all the way to the left by moving the line-of-sight, the operator then will have the optimal work distance available when moving back in the right hand direction.

The recalibration scheme works in a similar manner with regard to the right hand edge 103. When such a movement is made, the recalibration scheme will grab the cursor and hold it at the maximum value of X at whatever Y coordinate corresponds to the position of the cursor at that X value, when the cursor first hits $X_{MAX}$, and no matter how much further the operator moves the line-of-sight to the right, even off the screen, the recalibration scheme will hold the cursor in that last mentioned position. Then, when the user moves to the left, the last measured value of the line-of-sight at the right hand edge, 103 will become the reference value and the cursor will move to the left by the change in the measured value of line-of-sight as translated to the cursor movement. Similarly, to the above described situation with regard to the left hand edge, 101, this means that if the operator moves all the way out to the right, then the operator will have the optimal work distance when moving back to the left. The recalibration scheme operates in the same manner for vertical movement regarding the upper edge, 105 and the lower edge 107. For ease in explanation, FIG. 16 shows certain representative values for certain possible positions of the cursor.

As shown in FIG. 16, the screen 100 may be split into two screens in order for the user to be able to operate the whole active monitor screen with natural rotation movement to the left and to the right. The normal monitor screen is wider in the horizontal direction than in the vertical direction. It is possible to refrain from making two screens out of the screen 100 through redesign of the lens and light sources or through the use of a differently shaped focusing reflector. Such a different focusing reflector needs to be designed so that less rotation would be required in the horizontal direction than in the vertical direction in order to move the line-of-sight a prescribed distance on the screen. As is seen from FIG. 16, the typical screen 100 has vertical sides 101 and 103 which are shorter than the horizontal sides 105 and 107, thus, the distance from the center of the screen up and down is less than the distance on the screen from the center left and right.

As further shown in FIG. 16, when the screen 100 is divided into two screens, the left hand screen is designated by reference numeral 100a and the right hand screen is designated by the reference numeral 100b. When the user moves the line of sight in the right hand direction along the screen 100a, when the cursor passes the line 109 and arrives at the position designated by the coordinates $(X_{MAX}/2+1, Y)$ as seen in FIG. 16, the cursor will jump to the position designated by the coordinate $(X_{MAX}, Y)$ or, in other words, from the right hand edge of the screen 100a to the right hand edge of the screen 100b. When the user moves the line-of-sight and thereby the cursor in the left hand direction away from the coordinate $(X_{MAX}, Y,)$ when the cursor arrives at the point $(X_{MAX}/2, Y)$ which lies directly on the line 109, the cursor as preprogrammed will jump to the position $(X_0, Y)$ or, in other words, from the left hand edge of the screen 100b to the left hand edge of the screen 100a.

Figure 17:
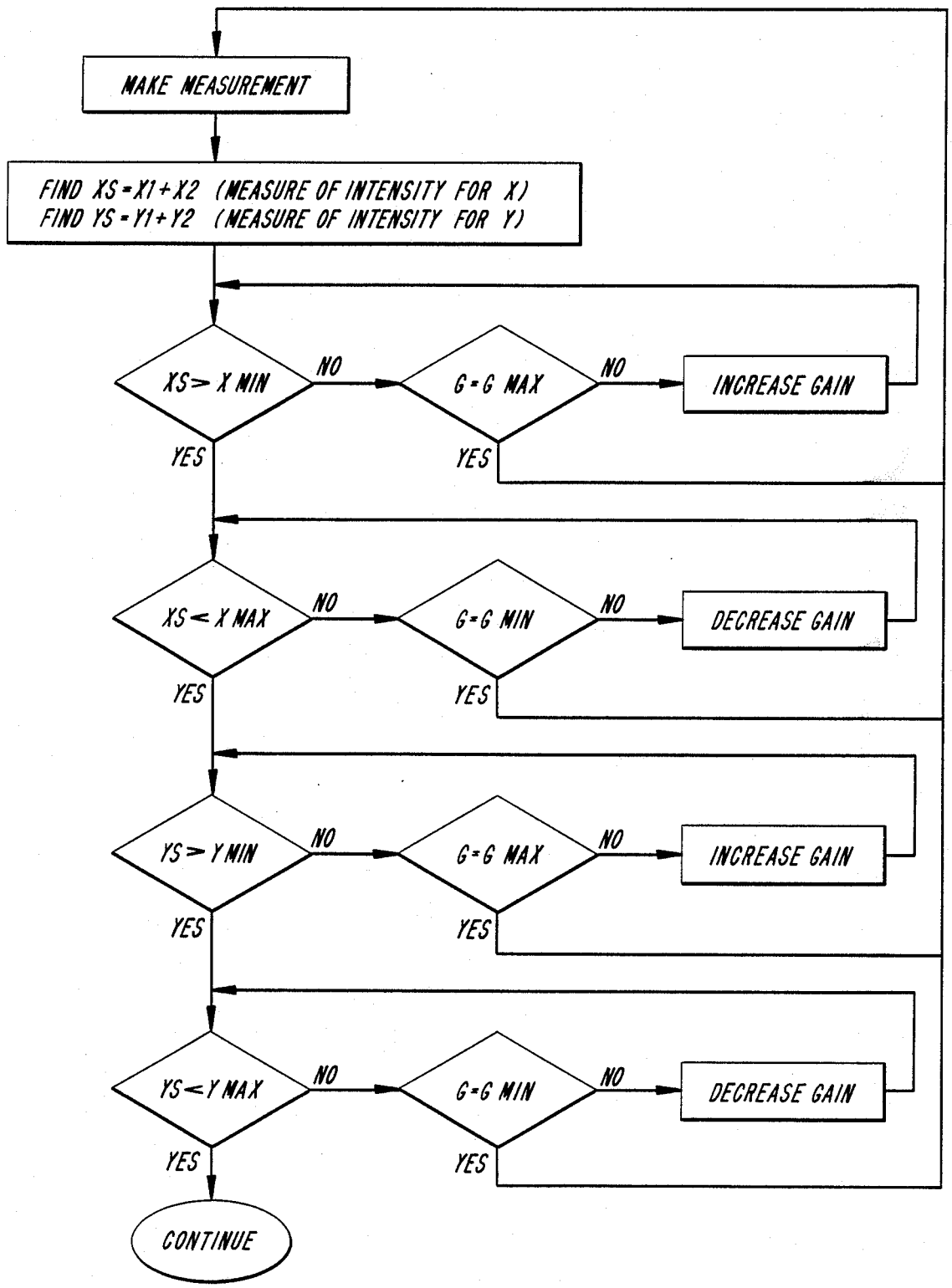
FIG. 17 shows a flow chart of an aspect of the present invention related to the operation thereof when the focusing reflector is outside the work area.

Reference is now made to FIGS. 17 and 18 for discussion of one aspect of the present invention which is known as the "gain feedback scheme". The gain feedback scheme measures the intensity of the light reflected from the focusing reflector 11 or 21. As stated hereinabove, the sum of the current converted to voltages and read by the analog-to-digital converter 49 is proportional to the intensity of the reflected light. It is desirable to control the intensity of the light on the horizontal and vertical plates of the position sensing detector 13. The microprocessor 53 has accordingly been programmed for such control and the flow chart thereof is best seen in FIG. 17. FIG. 17 also incorporates therein the "out of work area" scheme which is also programmed into the microprocessor 53 so that if the received intensity of the reflected light from the focusing retroreflector 11 or 21 is below a predetermined minimum, this is indicative of the fact that no user is in the work area or, alternately, no focusing reflector is reflecting light in the work area. During this condition, the system will not indicate any movement of the cursor which could be caused by undesirable noises, undesirable reflections, artificial light or sunlight. Thus, for example, as explained in FIG. 17, if either the X or Y coordinates of the cursor is at either the maximum or minimum value of X or Y, and the gain is at a maximum, yet the received intensity of reflected light is below a pre-determined minimum, this is indicative that the user is out of the work area and the system lies dormant until appropriate signals are later received indicative of the fact that the focusing reflector is located within the work area and pointed in a direction enabling the reflection of light back to the position sensing detector 13.

The flow chart shown in FIG. 17 shows the manner in which the gain of the present invention is increased or decreased responsive to the sensing of the location of the cursor at an extreme edge of the screen. For example, if $X_S$ is greater than $X_{MAX}$, then the gain is decreased, if the gain is decreased until it reaches $G_{Minimum}$ then there is too much reflection and this indicates that there is something wrong with the system. Perhaps somebody is playing with the lens, putting something too close to the lens, or perhaps extreme sunlight or artificial light are facing directly into the lens. In any of these circumstances, an error flag is activated and the cursor may move in a circular fashion in the middle of the screen until the problem is corrected. A similar result is obtained when $Y_S$ becomes greater than $Y_{MAX}$. Further, a similar result is obtained when $Y_{Min}$ becomes less than $Y_0$ and $X_{Min}$ becomes less than $X_0$.

The specific circuitry utilized in the gain feedback scheme is seen in FIG. 18. The entire circuit is generally designated by the reference numeral 110 and further reference is made to FIG. 2 which shows the manner of connection of the circuit 110 into the microprocessor. With further reference to FIG. 2, it is noted that the circuits 110 and 111 are identical to one another with the circuit 110 being utilized to control the light sources 15 and the circuit 111 being utilized to control the light sources 19, with the light sources 15 and 19 being shown in exemplary form as light emitting diodes. Comparison of FIGS. 2 and 18 should make clear that the manner of connection of the circuit 110 to the microprocessor 53 is via the ports PC0, PC1 and PC2 of the microprocessor 53, and respective electrical wires 52, 54 and 55. In a similar manner, the circuit 111 as connected to the microprocessor 53 via the microprocessor ports PC3, PC4 and PC5 via the respective electrical wires 56, 57 and 58. The gain feedback circuit 110 as shown in FIG. 18 is designed to control the light output of the light sources 15 shown in FIG. 18 as light emitting diodes. Such control is accomplished through control of the current flowing through the light sources 15.

As shown in FIG. 18, the circuit 110 (and the circuit 111) includes three subcircuits connected to one another in parallel and designated in FIG. 18 with the reference numerals A, B and C respectively. Each of these subcircuits includes respective resistors 113, 115, 117, 119 and 121. Each of the subcircuits further includes transistors 123, and 125. In one example of a circuit which may be made in accordance with the present invention, each of the resistors 113 may have a value of 4.7 K ohms, each of the resistors 115 may have a resistance of 10 K ohms, each of the resistors 117 may have a resistance of 470 ohms and each of the resistors 119 may have a resistance of 100 ohms. In the same example, the resistor 121 of subcircuit A may have a resistance of 10 ohms, the resistor 121 of subcircuit B may have a resistance of 5 ohms and the resistor 121 of subcircuit C may have a resistance of 1 ohm. As should be evident to one skilled in the art, with at least one of the subcircuits A, B or C activated by the control port respectively PC0, PC1 or PC2, there are seven possible combinations of levels of current which may flow through the circuit 110 to thereby provide seven possible levels of light output from the light sources 15. Table 1 shows the circuit resistance which is inversely proportional to the circuit current for activations of the various combinations of the ports PC0, PC1 and PC2, with 0 indicating an off condition and 1 indicating an on condition.

| Resistance | PC2 | PC1 | PC0 |
|---|---|---|---|
| 10 | 0 | 0 | 1 |
| 5 | 0 | 1 | 0 |
| 3.33 | 0 | 1 | 1 |
| 1 | 1 | 0 | 0 |
| 0.909 | 1 | 0 | 1 |
| 0.833 | 1 | 1 | 0 |
| 0.769 | 1 | 1 | 1 |

In the operation of the gain feedback circuitry shown in FIG. 18, the microprocessor 53 activates the circuits 110 and 111 in a sequential fashion so that light is emitted, reflects off of the focusing retroreflector and impinges upon the horizontal and vertical aspects of the position sensing detector 13. The microprocessor receives the appropriate signals from the analog-to-digital converter 49 and one of the things which the microprocessor senses is the intensity of the light impinging upon the layers 27 and 29 of the position sensing detector 13. As explained by the flow chart shown in FIG. 17, the circuit shown in FIG. 18 is usable to determine whether the users line-of-sight is aiming away from the screen 100 (FIG. 16) or whether there is some malfunction in the system as explained hereinabove. FIG. 19 shows the specific details of the audible feedback interface designated by reference numeral 59 in FIG. 2. The microprocessor controls the activation of the buzzer 60 through the port PB5 and the electrical line 61. Comparison of FIGS. 2 and 19 will reveal how the circuit 59 is connected into the circuitry shown in FIG. 2. As should be evident form a comparison of FIGS. 18 and 19, the interface circuit 59 is substantially identical to the subcircuit A of circuit 110. The purpose for the interface circuit 59 is merely to control the current going through the sound buzzer 60. The specific elements of the interface circuit 59 are given the same reference numerals as are the subcircuits A, B and C of the circuit 110 and it is important that the power transistor 125 of the interface circuit 59 is included so as to provide sufficient power to render the buzzer 60 sufficiently audible.

The present invention is designed to compensate for the parallax which occurs due to the fact that the position sensing detector 13 is mounted on top of the monitor, as shown for example in FIG. 11, in use. In compensating for parallax, an initial calibration is done through the selection of translation coordinates ($X_{ST}$, $Y_{ST}$). No compensation is made in the horizontal direction because the user in the middle of the screen as is the position sensing detector. A translation must be used in the vertical direction since the position sensing detector is sitting on top of the monitor.

The present invention is equipped with an ambient light filter so that the position sensing detector 13 only reacts to light reflected off of the focusing retroreflector. In one embodiment of the present invention, a bandpass filter which cuts off wavelengths outside the wavelengths used for transmission is used.

There are several applications of the present invention which have been contemplated by the inventor, and those discussed hereinbelow are not considered to be the complete list or to be limiting in any way.

(1) The present invention may be utilized for the activation of instruments within the necessity for touching the instruments. Such instruments as airplane and other vehicle controls, air traffic controls, utility room controls, and industrial controls may be activated through the use of the present invention.

(2) The present invention may be used in any computer-related activity where the computer may be activated merely by moving the head of the operator thereof. Further, a lecturer in a classroom may utilize the present invention to enable movement freely about a room while pointing to the screen from any location to thereby make the presentation more relaxed and natural.

(3) As described in great detail hereinabove, the present invention may be utilized to directly replaced the "mouse" input device for a computer such as the Apple MacIntosh computer. In this mode, the present invention may use all the existing software without alteration and the present invention eliminates the need for the desk-top space which is required by the use of the mouse.

The present invention can also replace touch screens digitizers and cursor functions directly, or any device which is used to control cursor movement.

(4) The focusing reflector of the present invention may be placed on any part of the body that a disabled person is able to move and with the position sensor then placed in front of the person, body movement will then result in cursor movement which will in turn enable the selection of letters or phrases or any other items on a menu which has been preprogrammed to appear on a computer screen. In this way, a handicapped person may communicate with the computer and thereby with a person located in a remote location.

(5) The present invention may be utilized to play games which can be designed where the players need only move their head. In order to increase the complexity of such games, both the head and hands may be utilized with focusing reflectors attached to each along with the appropriate narrow bandwidth optical filters as described in greater detail hereinabove.

The present invention has been described in terms of several embodiments thereof. It is noted, however, that various changes, alterations, and additions may be made the teachings as set forth hereinabove without departing from the intended scope of the present invention. Accordingly, it is intended that the scope of the present invention only be limited by the scope of the following claims.

I claim:

1. A cursor control system for measuring movements including linear movements and rotational movements of object means placeable in a predetermined space in front of a display means, said system displaying said movements in the form of a display indicative of the line-of-sight between said object means and a prescribed target, comprising:
   (a) light source means;
   (b) position sensing detector means adjacent said light source means;
   (c) focusing reflector means attached to said object means;
   (d) control means for controlling activation of said light source means, for receiving signals from said position sensing detector means and for calculating said line-of-sight; and
   (e) said display means connected to said control means for displaying information indicative of changes in said light-of-sight in the form of changes in the position of a display cursor.

2. The invention of claim 1 wherein said light source means comprises a plurality of light emitting diodes.

3. The invention of claim 2, wherein said diodes are connected to said control means in series therewith.

4. The invention of claim 2, wherein said diodes emit infrared light.

5. The invention of claim 1, wherein said light source means comprises a first light source of a first distinct wavelength and a second light source of a second distinct wavelength, said control means alternately activating and deactivating said light sources.

6. The invention of claim 5 wherein said object means comprises first and second separate objects, and said focusing reflector means comprises a first focusing reflector attached to said first object and a second focusing reflector attached to said second object.

7. The invention of claim 6, wherein said first focusing reflector has attached thereto a first optical filter allowing solely light at said first wavelength to pass therethrough, and said second focusing reflector has attached thereto a second optical filter allowing solely light at said second wavelength to pass therethrough.

8. The invention of claim 1, wherein said focusing reflector means comprises a parabolic-shaped reflector.

9. The invention of claim 1, wherein said control means comprises a microprocessor.

10. The invention of claim 9, further including an analog-to-digital converter connected between said position sensing detector means and said microprocessor.

11. The invention of claim 10, further including preamplifier means connected between said position sensing detector means and said analog-to-digital converter, said preamplifier means receiving currents from said position sensing detector means and converting the currents to voltages which are inputted into said analog-to-digital converter.

12. The invention of claim 9, wherein said microprocessor includes output port means connectable to a port in an associated host computer, said port being utilized to control said display cursor on said display means, said display means comprising a screen of said computer.

13. The invention of claim 1, further including audible feedback means controlled by said control means, said control means actuating said audible feedback means responsive to sensed time of movement of said line-of-sight.

14. The invention of claim 1, wherein said control means includes means for causing said display means to be split into a plurality of subdisplays.

15. The invention of claim 1, wherein said control means includes means sensing the intensity of light received by said position sensing detector means and, responsive thereto, said sensing means adjusts the intensity of said light source means by adjusting the current supplied thereto.

16. The invention of claim 15 wherein said intensity sensing means includes means sensing when said line-of-sight does not include said display.

17. The invention of claim 16, wherein said control means includes means for initially calibrating said system without cursor involvement or user involvement.

18. The invention of claim 17, wherein said control means includes means for automatically self-re-calibrating said system so that a user thereof can leave the work area and later return thereto without loss of system function.

19. The invention of claim 18, wherein said control means includes means for keeping track of the last instantaneous position of that cursor which translates the relative change in position between an old and new position of the cursor into electrical signals so as to simulate a mouse or other cursor movement input device.

20. The invention of claim 13 or 19, wherein said control means includes means for measuring a time period during which the user is holding the line-of-sight on a specific point of the computer display, said control means responding to said time period and in response thereto generating electrical signals in said computer corresponding to one of one click, two clicks, or hold down.

21. The invention of claim 20, wherein said focusing reflector means may be placed on any part of the user's body, for operation when this pat of the body is moved.

22. The invention of claim 21, wherein said control means includes means compensating for ambient light by reading system voltages with and without said light sources being activated.

23. The invention of claim 22, further including preamplifier means interposed between said position sensing detector means and said control means, said control means compensating for preamplifier noise.

24. The invention of claim 1, wherein said position sensing detector means includes a lens for focusing light on an active area of said position sensing detector means.

25. A method for controlling a cursor for measuring linear and rotational movements of object means placeable in a predetermined space in front of a display means, the display of said display means being indicative of the line of sight between said object means and a prescribed target, including the steps of:
 (a) locating a position sensing detector adjacent; said space above said display means;
 (b) locating a source of light adjacent said position sensing detector;
 (c) attaching a focusing reflector to said object means;
 (d) locating said object means in said space;
 (e) activating said source of light, light from said source of light being focused by said focusing reflector and being reflected back toward said position sensing detector;
 (f) receiving said light at said position sensing detector at a location thereon corresponding to said line-of-sight;
 (g) calculating, with a control means, said line-of-sight from data received from said position sensing detector related to said location, said calculating step including the substep of measuring said linear and rotational movements; and
 (h) displaying said line-of-sight in the form of movements of a display cursor of said display means.

26. The method of claim 25, further including the step of calibrating said control means.

27. The method of claim 25, further including the step of measuring a time period during which a particular line-of-sight is maintained and, responsive thereto, generating an electrical signal at said control means corresponding to one of one click, two clicks of hold down.

28. The method of claim 25, further including the step of compensating for ambient light by reading system voltages with and without said source of light being activated.

29. The method of claim 25, further including the step of compensating for electrical noise.

* * * * *